United States Patent [19]

Koksbang

[11] Patent Number: 5,336,572

[45] Date of Patent: Aug. 9, 1994

[54] VANADIUM OXIDE CATHODE ACTIVE MATERIAL AND METHOD OF MAKING SAME

[75] Inventor: Rene Koksbang, San Jose, Calif.

[73] Assignee: Valence Technology, Inc., San Jose, Calif.

[21] Appl. No.: 77,485

[22] Filed: Jun. 14, 1993

[51] Int. Cl.$^5$ ............................................. H01M 4/02
[52] U.S. Cl. .................... 429/218; 429/223; 429/224; 429/229
[58] Field of Search ................ 429/218, 223, 224, 229

[56] References Cited

U.S. PATENT DOCUMENTS 4,830,930 5/1989 Lee et al. .
5,039,582 8/1991 Pistoia ............................. 429/21 D

OTHER PUBLICATIONS

Casalot and Hagenmuller, J. Inorganic Nuclear Chem., 1969, vol. 31, 3049-3058.
K. West, B. Zachau-Christiansen et al, Solid State Ionics, 40/41, pp. 585-588 (1990) (month not available).
K. West, B. Zachau-Christiansen et al, Solid State Ionics, 28/30, pp. 1128-1131 (1988) (month now available).

Primary Examiner—Stephen Kalafut
Assistant Examiner—M. Nuzzolillo
Attorney, Agent, or Firm—Linda Deschere

[57] ABSTRACT

The present invention provides a lithium battery comprising a cathode active material having as its major component an oxide of vanadium, which is a compound of the general formula $M_xV_3O_8$. The vanadium oxide active material of the invention is prepared by a series of steps in which a precursor $ZV_3O_8$-based compound undergoes quantitative ionic substitution to provide $M_xV_3O_8$, where M is a mono-, di-, tri- or tetravalent metal or semi-metal element.

25 Claims, 3 Drawing Sheets

Fig. 3

| Li 1.55 | Be 0.89 | | | | | | | | | | | B 0.80 | | | | |
|---|---|---|---|---|---|---|---|---|---|---|---|---|---|---|---|---|
| Na 1.90 | Mg 1.36 | | | | | | | | | | | Al 1.25 | | | | |
| K 2.35 | Ca 1.74 | Sc 1.44 | Ti 1.32 | V 1.22 | Cr 1.17 | Mn 1.17 | Fe 1.16 | Co 1.16 | Ni 1.15 | Cu 1.17 | Zn 1.25 | Ga 1.25 | | | | |
| Rb 2.48 | Sr 1.91 | Y 1.45 | Zr 1.45 | Nb 1.34 | Mo 1.29 | Tc | Ru 1.24 | Rh 1.25 | Pd 1.28 | Ag 1.34 | Cd 1.41 | In 1.50 | | | | |
| Cs 2.67 | Ba 1.98 | La 1.69 | Hf 1.44 | Ta 1.34 | W 1.30 | Re 1.28 | Os 1.26 | Ir 1.26 | Pt 1.29 | Au 1.34 | Hg 1.44 | Tl 1.55 | | | | |

The present invention provides a lithium battery comprising a cathode active material having as its major component an oxide of vanadium, which is a compound of the general formula $M_xV_3O_8$. The vanadium oxide active material of the invention is prepared by a series of steps in which a precursor $ZV_3O_8$-based compound undergoes quantitative ionic substitution to provide $M_xV_3O_8$, where M is a mono-, di-, tri- or tetravalent metal or semi-metal (metallic) element, other than lithium. The value of x is greater than zero and less than two. Preferably x is one or close to one, and the nominal general formula is $M_1V_3O_8$.

Preferably, the vanadium oxide based active material ($M_xV_3O_8$) is prepared for use in cells with an anode active material made of lithium or a compound which includes lithium. The cells also include an electrolyte which is electrochemically stable with respect to the cathode active material and lithium, and which allows lithium ions from the anode (negative electrode) to move therethrough to react electrochemically with the cathode active material of the invention.

Accordingly, in one embodiment, a cathode active material of the general nominal formula $M_xV_3O_8$ (vanadium oxide compound) is prepared from the precursor material ($ZV_3O_8$), preferably $LiV_3O_8$, by substitution of the $Z+$ or $Li+$ ion for mono-, di-, tri- and tetravalent ions of other metals or semi-metals in a series of reactions. Although the starting material $LiV_3O_8$ is preferred, it is also possible to achieve substitution of the $Z+$ ion using precursor compounds where $Li+$ is substituted by $Na+$ or $K+$. In addition, $NaV_3O_8$ and $KV_3O_8$ are suitable vanadium oxide compounds for use as the active material, and may be prepared from an $LiV_3O_8$ precursor.

An active material of the formula $M_xV_3O_8$ may contain more than one type of element M. That is, an active material constituting a mixture of M ions may be used. For example, it is possible to use two transition metals (M', M'') of similar or different valences in a single active material. In use, the active material of the nominal formula $M_xV_3O_8$ intercalates lithium, resulting in $Li_yM_xV_3O_8$.

A preferred lithium cell comprises the positive electrode active material of the invention, a negative electrode which is metallic lithium, and an electrolyte which is a solid electrolyte or electrolyte separator in the form of a polymeric network containing an electrolyte solution comprising a metal salt of lithium.

Accordingly, it is an object of the invention to provide a new cathode (positive electrode) vanadium oxide based active material for a lithium battery. Another object is to provide a method of making the new cathode material and the battery containing such cathode material. It is also an object of the invention to provide a lithium battery having a cathode active material containing a vanadium oxide based active material of the general formula $M_xV_3O_8$, where M is selected to provide structural stability for maintaining structural integrity of the oxide based material during charge and discharge. Another object is to provide a lithium battery having good charge and discharge capacity over its useful operating life.

These and other objects, features and advantages will become apparent from the following description of the preferred embodiments, appended claims and accompanying drawings.

BRIEF DESCRIPTION OF THE DRAWINGS

FIG. 3 is a chart showing radii of various metallic elements.

DETAILED DESCRIPTION OF THE PREFERRED EMBODIMENTS

Figure 1:
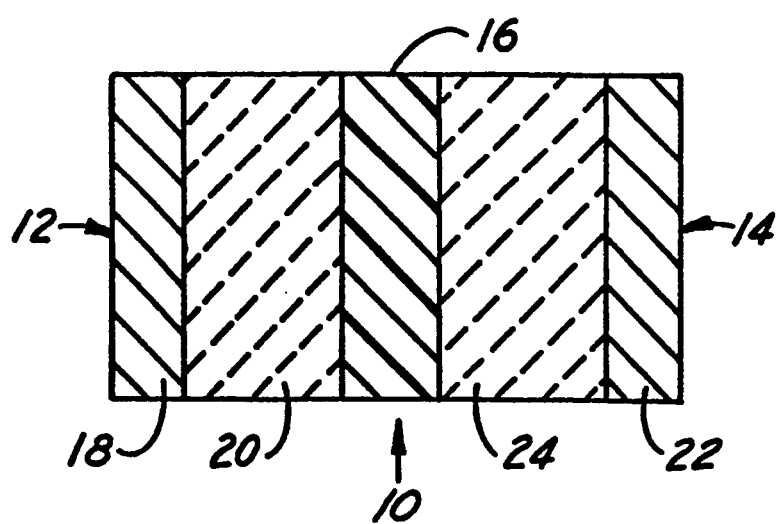
FIG. 1 is an illustration of a cross-section of a thin battery or cell embodying the invention.

As shown in FIG. 1, an electrochemical cell or battery 10 has a negative electrode side 12, a positive electrode side 14, and a separator 16 therebetween. In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode active material 20. The negative electrode active material 20 is sometimes simply referred to as the negative electrode. The positive electrode side includes current collector 22, typically of aluminum, nickel, iron, stainless steel, and/or copper foil, or such foils having a protective conducting coating foil, and a body of positive electrode active material 24 which has as its main component one or more oxides of vanadium. The positive electrode active material 24 is sometimes simply referred to as the positive electrode. The separator 16 is typically a solid electrolyte, electrolyte separator. A suitable electrolyte separator (polymer electrolyte) is described in U.S. Pat. No. 4,830,939 incorporated herein by reference. The electrolyte separator is a solid organic polymer matrix containing an ionically conducting liquid with an alkali metal salt and the liquid is an aprotic polar solvent. The terms "solid electrolyte" and "electrolyte separator" are used interchangeably in industry. Sometimes, the term "separator" is used.

The composition of the positive electrode active material 24 has a significant influence on the performance of battery 10. This is because when transition metal oxides are used as cathode active materials in such batteries, a declining capacity occurs during cyclic operation of the battery. This is thought to be due to the volume changes of the material which take place when lithium is inserted and extracted from the transition metal intercalation material.

In the case of $LiV_3O_8$, it is thought that the $V_3O_8-$ layers are held together by $Li+$ ions. This produces rather weak bonding which is very likely to be responsible for structural instability of the material which manifests itself as a decline in capacity. It is thought that charge retention during cyclic operation can be improved by increasing the strength of the bonds which hold the $V_3O_8-$ layers together and, therefore, maintain structural integrity of the vanadium oxide based ($V_3O_8-$) cathode active material.

Accordingly in one embodiment, a cathode active material of the general nominal formula $M_xV_3O_8$ (vanadium oxide compound) is prepared from the precursor material ($ZV_3O_8$), preferably $LiV_3O_8$, by substitution of the $Z+$ or $Li+$ ion for mono-, di-, tri- and tetravalent ions of other metals or semi-metals in a series of reactions. Although the starting material $LiV_3O_8$ is preferred, it is also possible to achieve substitution of the $Z+$ ion using precursor compounds where $Li+$ is substituted by $Na+$ or $K+$. In addition, $NaV_3O_8$ and $KV_3O_8$ are suitable vanadium oxide compounds for use as the active material, and may be prepared from an $LiV_3O_8$ precursor.

The $ZV_3O_8$ precursor may readily be formed from a $V_2O_5$ starting material which in turn is prepared from ammonium metavanadate. The process begins with heating the ammonium metavanadate ($NH_4VO_3$) to a temperature of about 400° C. to about 450° C. to decompose it to crystalline $V_2O_5$ in the presence of oxygen. Crystalline $V_2O_5$ has been used to prepare cathodes for use with lithium-based anodes. The lithium vanadium oxide of the nominal general formula $LiV_3O_8$ is prepared by forming an aqueous mixture of the $V_2O_5$, prepared as described above, and including LiOH in the mixture. The amounts of $V_2O_5$ and LiOH correspond to the stoichiometric amounts of the two compounds needed for formation of $LiV_3O_8$. Preferably, excess LiOH is used. It is thought that part of the $V_2O_5$ dissolves in solution, followed by reaction between the dissolved $V_2O_5$, LiOH and water and then with the remaining solid $V_2O_5$, with the subsequent formation of $LiV_3O_8$. The reaction is fairly slow at room temperature, but proceeds at a reasonable rate at 50° C. to 60° C.

A process of adding progressively larger amounts of vanadium pentoxide to an LiOH solution is more fully described in U.S. Pat. No. 5,039,582 which is incorporated in its entirety by reference. The $LiV_3O_8$ product typically forms a very fine precipitate. The lithium-vanadium oxide product of the nominal general formula $LiV_3O_8$ is preferably in a completely amorphous state. The amorphous state is beneficial for rate capabilities and energy density.

An alternative method of forming the precursor $LiV_3O_8$ is by melting of $V_2O_5$ with $Li_2CO_3$ at a temperature of at least about 600° C. The melt, once cooled, gives rise to solid material which may then be crushed for further processing. In a variation of the process, the melt is cooled from a temperature of about 800° C. to about 900° C., and rapidly quenched to obtain a high degree of an amorphous character and a less crystalline character. In contrast, the amorphous form of $LiV_3O_8$, described above, is readily obtained by synthesis in a water solution by reaction between lithium hydroxide (LiOH) and vanadium pentoxide ($V_2O_5$) in suitable proportions. The amorphous form of the $LiV_3O_8$, when heated to very high temperatures of about 350° C., begins to acquire a crystalline structure. As stated, it is thought that the amorphous form of $LiV_3O_8$ is preferred. Similar methods may also be used to form the $ZV_3O_8$ precursor where lithium is replaced by sodium or potassium. For example, $Na_2CO_3$ is used in the process described above in place of $Li_2CO_3$.

The starting precursor material, $ZV_3O_8$ is used in a series of steps where ion exchange occurs. In the first step, the $ZV_3O_8$ (namely, $LiV_3O_8$, $NaV_3O_8$, $KV_3O_8$) is dispersed in a first solution which contains about 1 molar aqueous (sulfuric acid) $H_2SO_4$. Other acids and equivalent concentrations may be used, however, sulfuric acid is preferred because of the relative inertness of the sulphate ion. The dispersed mixture is stirred for 2 to 10 hours, whereby the $Z+$ ion (i.e. $Li+$, $Na+$ or $K+$) is exchanged almost quantitatively by $H+$. This occurs at a temperature in a range of about 10° C. to about 85° C. It is preferred to stir the solution. The product of this step is represented by the general formula $HV_3O_8$. The $H+$ ion is in turn readily ion exchanged with other mono-, di-, tri- and tetravalent metal and semi-metal (metallic) ions in the next step of the process. This second step replaces the hydrogen ion with M ions, where $M+$ is the monovalent, divalent, trivalent or tetravalent ion of the final compound desired $M_xV_3O_8$. This stage consists of forming a solution comprising the $HV_3O_8$ product and a salt of the metal or semi-metal (M). The ion exchange of the $H+$ ion for the $M+$ ion occurs at a temperature in a range of about 10° C. to about 85° C. The product of this reaction quantitatively forms in about 2 to about 10 hours. It is preferred to stir the solution.

In the first step, to ensure that the reaction is as complete as possible, the powder may be filtered and dispersed in new, fresh 1 M $H_2SO_4$, several times. Since $H+$ is consumed, the pH of the solution decreases during the reaction. The start conditions are defined by the concentration of the acid and the end conditions are dependent on the solid's affinity for protons, the exchange degree and temperature. When $HV_3O_8$ is formed, it is filtered and washed with water to remove the traces of acid. When the washing water is neutral, filtrate drying is not essential. In the second step, the washing water is dispersed in a salt solution of the M ion which is to be ion exchanged into the structure. The reaction rate is proportional to the concentration, and in general, concentrations close to the solubility limit are used. This will of course depend on the compound. The reaction rate may also be increased by the use of alkaline metal salts because the OH— will facilitate extraction of the H+ from the structure. However, this only occurs if the ion exchange reaction on the particle surface is the rate determining reaction. The process provides quantitative ion exchange, that is, 90 to 100% of the H+ is replaced by M+. It is preferred that close to 100% exchange is achieved. It is possible to use more than one metal salt so that H+ is replaced by more than one type of M ion.

It is preferred that the M ion of the final product be a monovalent ion, such as $Na^+$, $K^+$, $Rb^+$, $Cs^+$, $Ag^+$, $Cu^+$; a divalent ion such as $Mg^{2+}$, $Ca^{2+}$, $Sr^{2+}$, $Ba^{2+}$, $Sc^{2+}$, $Fe^{2+}$, $Ni^{2+}$, $Co^{2+}$, $Cu^{2+}$ and $Zn^{2+}$, a trivalent ion ($L^{3+}$, L=lanthanide, $Cr^{3+}$, $Fe^{3+}$) or a tetravalent ion such as $Ce^{4+}$. Such M ions selected are from the group of metal and semi-metal elements which constitute about three-quarters of the Periodic Table. Such metal and semi-metal elements are also commonly referred to as metallic elements. The value of x in $M_xV_3O_8$ is greater than zero and less than two. Preferably, x is one or close to one, and the nominal general formula is $M_1V_3O_8$.

Metallic elements are distinguished from non-metallic elements by their luster, malleability, conductivity and usual ability to form a positive ion. Semi-metals are also considered in the group as having metallic characteristics, as distinguished from non-metals. Metals and semi-metals are capable of forming positive ions and are conductors of electricity. Conductivity of semi-metals is small, on the order of 10 to $10^{-5}$ ohm$^{-1}$ cm$^{-1}$. Metals have higher conductivities generally greater than $10^4$ ohm$^{-1}$ cm$^{-1}$. Such metals and semi-metals appear in the left hand part of the Periodic Table and are separated from the non-metals by a diagonal band of semi-metals that run from boron to tellurium. The classification of elements close to this group of semi-metals is not always understood. However, metallic behavior is found among the transition elements, the members of groups I and II, and the heavier elements of groups IIIB, IVB and VB. Transition elements occur between groups IIA and IIIB in the long form of the Periodic Table.

As stated earlier, the $MV_3O_8$ compounds include M which is a monovalent, divalent, trivalent or tetravalent ion. Common oxidation states of representative elements, and the transition elements which are particularly preferred as the ion M, are given in FIG. 2.

In order to obtain quantitative substitution of the H+ ion (in the $HV_3O_8$) for the M+ ion defined above, suitable sulfates, nitrates and other organic or inorganic salts of the appropriate metal or semi-metal ion (M+) are used. A second solution is formed containing the $HV_3O_8$. It is preferred that the anion of the salt is large in order to prevent inclusion of the anion in the final product lattice. The product of the ionic substitution reaction is preferably filtered and dried before use. It is thought that some of the formed vanadium oxide compounds ($M_xV_3O_8$) will be structurally similar to or perhaps identical to the structure of the precursor $ZV_3O_8$ starting materials, whereas others will convert to one or more structurally different phases during drying.

Preferred salts for use in the substitution of the H+ ion are sulfates and nitrates. Other salts which may be used are carbonates and other inorganic salts. Organic salts may also be used. Examples of salts are as follows: magnesium nitrate, cobaltous nitrate, manganese nitrate, nickel nitrate, ferric nitrate, zinc nitrate, magnesium carbonates, cobaltous carbonates, manganese carbonates, nickel carbonates, zinc carbonates, ferrous carbonate, magnetic iron oxide, cobaltic oxide, manganese dioxide, nickelic oxide, cupric oxide, cupric nitrate, cuptic carbonates, magnesium sulfate, cobaltons sulfate, manganese sulfate, nickel sulfate, ferrous sulfate, ferric sulfate, cuptic sulfate, zinc sulfate, magnesium oxalate, cobaltous oxalate, manganese oxalate, nickel oxalate, ferrous oxalate, zinc oxalate, cuptic oxalate, magnesium acetate, cobaltous acetate, manganese acetate, nickel acetate, ferrous acetate, ferric acetate, cuptic acetate, zinc acetate, magnesium formate, cobaltous formate, manganese formate, nickel formate, ferrous formate, cuprous formate, zinc formate. There is also, magnesium chlorate, cobaltous chlorate, nickel chlorate, cupric chlorate, magnesium perchlorate, cobaltous erchlorate, nickel perchlorate, ferric perchlorate, cupric perchlorate, manganese perchlorate and zinc perchlorate; and magnesium oxide, cobaltous oxide, manganese oxide, nickel oxide, ferric oxide, cuprous oxide, zinc oxide, magnesium hydroxide, cobaltous hydroxide, manganese hydroxide, nickel hydroxide, ferric hydroxide, cuprous hydroxide and zinc hydroxide.

Although many examples of the ion, sulfates, nitrates and other salts thereof are presented above, these examples are not limiting and others may be used in the invention.

As stated, it is preferred that the anion of the salt is large enough to prevent its inclusion into the product. Therefore, it is preferred that such anions are larger than the proton of the M ion in the $M_xV_3O_8$ composition. The atomic radii of various metallic elements are given in FIG. 3. This figure and similar tables having atomic radii serve as a guide to selecting the salt to be used with the M ion. Such charts are typically developed by determining the internuclear distance in a metallic crystal using x-ray diffraction. The apparent radius of an atom depends, to a certain degree, on the crystal structure.

The vanadium oxide compound of the invention ($M_xV_3O_8$) may be used to prepare electrodes by mixing the $M_xV_3O_8$, carbon (typical Shawinigan Black) and an electrolyte/binder. A typical composition is as given in Table 1. Carbon particles for use in electrodes may be obtained from a variety of sources such as Union Carbide, Noury Chemical Corporation, and other major chemical companies. In an as-received condition, such carbon particles have a BET surface area on the order of hundreds of square meters per gram. The particles have an average or median particle size or equivalent average diameter in the range of about 10 to about 100 nanometers (0.01 to 0.1 microns), and typically in the order of 30 nanometers. Thus, the carbon particles are very fine and of submicron size.

TABLE 1

| Typical Cathode Composition | Percent by Weight |
| --- | --- |
| $MV_3O_8$ | 45.2% |
| Carbon | 10.3% |
| Propylene Carbonate (PC) | 33.3% |
| PolyEthylene Oxide (PEO) | 1.0% |
| PolyEthyleneGlycolDiAcrylate (PEGDA) | 8.8% |
| TriMethylPolyEthylene Oxide TriAcrylate (TMPEOTA) | 1.5% |

The cathode is coated onto nickel foil followed by electron beam curing (cross-linking/polymerization) of the acrylate component. Then the electrolyte is coated on top of the cathode and cured with ultraviolet light. The lithium electrode is applied on top of the electrolyte separator and the battery is finally placed in a flexible pouch which is heat sealed under vacuum.

Figures 2A, 2B:
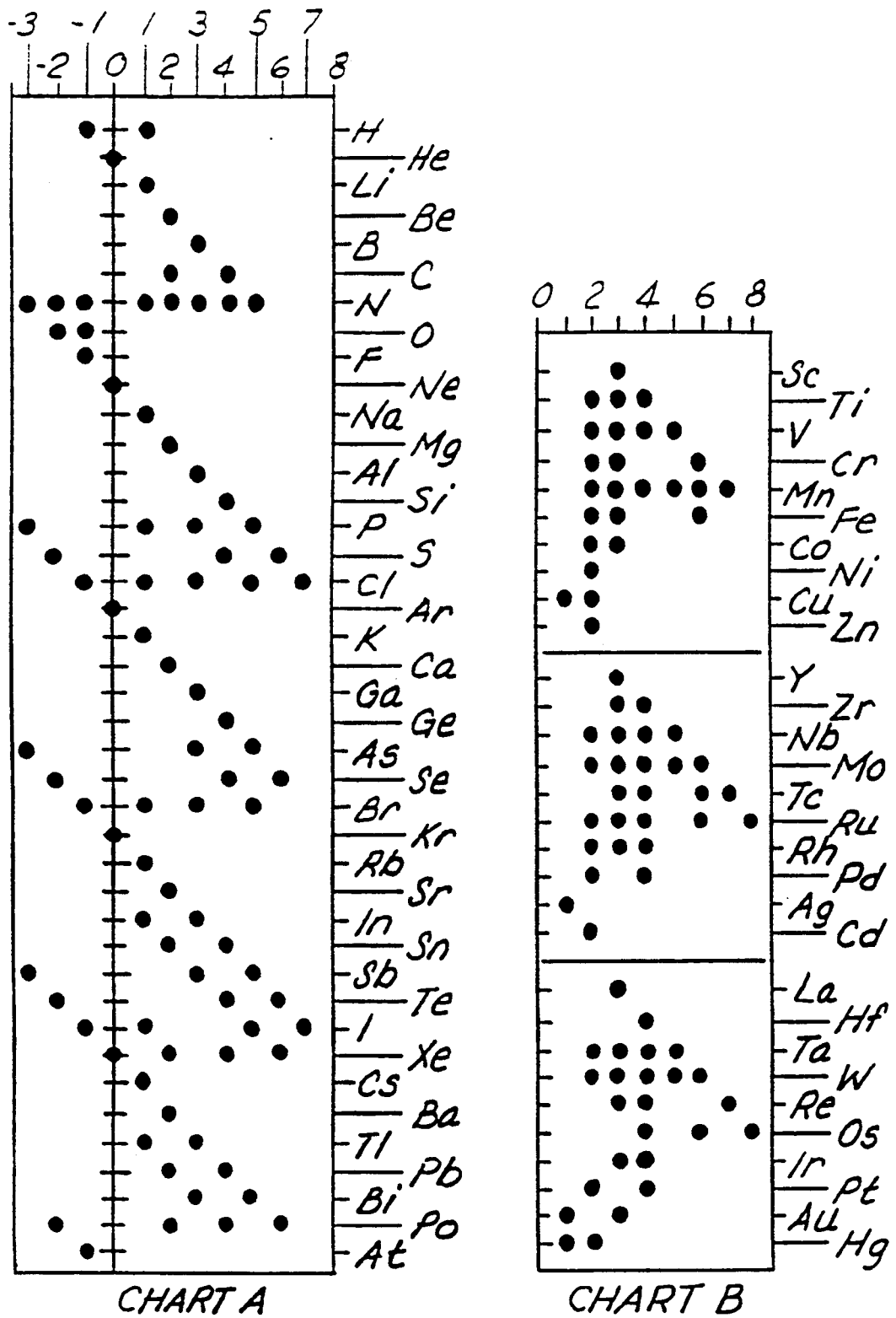
FIG. 2 contains charts (a,b) showing common oxidation states of representative elements (a) and transition elements (b).

The charge distribution in the $LiV_3O_8$ is thought to correspond to $Li^{+1}(V^{+5})_3$ and $(O^{-2})_8$ which is +1, +15, −16. In the case of a tetravalent ion such as $Ce^{+4}$, the charge distribution is $Ce^{+4}(V^{+4})_3(O^{-2})_8$ which is +4, +12, −16. Thus, the tetravalent ion has a positive charge ($Ce^{+4}$) not greater than the positive charge of the vanadium ($V^{+4}$) in the oxide in an initial condition before any lithium is intercalated. In some cases, during use of the battery, the average positive charge of the vanadium (V) may be less than the positive charge of M in the $MV_3O_8$, as Li+ is taken up. For example, assuming M is tetravalent (e.g. $Ce^{+4}$), vanadium may be reduced first. In mixed valence compounds, one ion tends to be reduced before the other one(s). To achieve a usable potential difference, the positive electrode is electrochemically oxidized, while the anode is reduced. Thus, during charging, a quantity y (y of lithium ion Li+) are accepted or intercalated into the positive electrode active material of the invention. It is thought that when this occurs, the oxidation states of M and V (in $Li_yM_xV_3O_8$) change. It is expected that during typical operation, the positive electrode can intercalate up to about 3 to about 4 moles Li+ per mole of $M_xV_3O_8$ where M is monovalent (+1); up to about 3 to about 5 moles Li+ per mole $MV_3O_8$ where M is bivalent (+2); up to about 3 to about 6 moles where M is trivalent (+3); and up to about 3 to about 7 moles where M is tetravalent (+4). In all such cases, it is assumed that each mole of $MV_3O_8$ has one M ion (i.e. $M_x$, where x=1). Accordingly, upon operation of the battery, the nominal general formula is $Li_yM_xV_3O_8$ where y begins with y equal to about zero and then y increases up to y equal to about seven, depending on the M ion present or combination of M ions present. Of course, as the cell cycles, the value of y continuously changes A trivalent ion, such as $Fe^{+3}$ is able to exist in a $Fe^{+2}$ state and is expected to contribute to the capacity by changing to a lower oxidation state upon Li+ intercalation. The M ion $Cu^{+2}$ is capable of a +1 oxidation state and would provide a similar advantage. Refer to FIG. 2 for oxidation states.

The cathode properties of $MV_3O_8$ are expected to be similar to or better than those of $LiV_3O_8$. The cathode properties of the metal substituted $LiV_3O_8$, that is, $MV_3O_8$ where M is a metal, and preferably a transition metal are expected to be better than the cathode properties of the alkalized $V_3O_8$, namely, $NaV_3O_8$ and $KV_3O_8$. Accordingly, in the case of ions with higher charge, and metals which can exist in several oxidation states (FIG. 2), it is likely that the second metal ion will participate in the insertion reaction, whereby the capacity of the cathode is increased compared to the precursor material.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. A positive electrode comprising a carbon-containing material intermingled with an active material, said active material comprising a vanadium oxide compound represented by the nominal general formula $M_xV_3O_8$, where M in the compound is a metal or semi-metal element other than Group I alkali metals, and where x has a value greater than zero and less than two.

2. The electrode according to claim 1, wherein M is a mono-, di-, tri- or tetra-valent ion.

3. The electrode according to claim 1, wherein M is selected from the group consisting of transition metals.

4. The electrode according to claim 1, wherein M is selected from the group consisting of Rb, Cs, Ag, Cu, Mg, Ca, Sr, Ba, Sc, Fe, Ni, Co, Zn, L, Cr, and Ce.

5. A battery having a lithium-based negative electrode, and a positive electrode comprising a vanadium oxide compound represented by the nominal general formula $M_xv_3O_8$, where M in the compound is a metal or semi-metal element other than Group I alkali metals, and where x has a value greater than zero and less than two.

6. The battery according to claim 5, wherein M has a valency greater than 1 and less than 5.

7. The battery according to claim 5, wherein M is selected from the group consisting of transition metals.

8. The battery according to claim 5, wherein M is selected from the group consisting of Ag, Cu, Mg, Ca, Sr, Ba, Sc, Fe, Ni, Co, Zn, L, Cr, and Ce.

9. A lithium battery positive electrode comprising a carbon-containing material intermingled with an active material, said active material comprising a vanadium oxide compound in an initial or charged condition represented by the nominal general formula $M_xV_3O_8$ where M in the compound is a metal or semi-metal element other than zero and less than two, and in a partially or fully discharged condition comprising said compound in a lithiated state represented by the nominal general formula $Li_yM_xV_3O_8$ where y has a value greater than zero and up to about 7.

10. The positive electrode according to claim 9, wherein M is selected from the group consisting of transition metals.

11. The positive electrode according to claim 9, wherein M is selected from the group consisting of Rb, Cs, Ag, Cu, Mg, Ca, Sr, Ba, Sc, Fe, Ni, Co, Zn, L, Cr, and Ce.

12. A lithium battery positive electrode comprising an active material comprising a vanadium oxide compound in an initial or charged condition represented by the nominal general formula $M_xV_3O_8$ where M in the compound is a metal or semi-metal element other than Group I alkali metals and where x is greater than zero and less than two, and in a partially or fully discharged condition comprising said compound in a lithiated state represented by the nominal greater formula $Li_yM_x-V_3O_8$ where y has a value greater than zero and up to about 7.

13. The positive electrode according to claim 12, wherein M is selected from the group consisting of transition metals.

14. The positive electrode according to claim 12, wherein M is selected from the group consisting of Ag, Cu, Mg, Ca, Sr, Ba, Sc, Fe, Ni, Co, Zn, L, Cr, and Ce.

15. A method of forming a compound for use as an active material of an electrode, comprising:

a) forming an aqueous solution containing a compound having the general formula $ZV_3O_8$, where Z is a Group I alkali element, the aqueous solution being at an acidic pH sufficient to cause ion exchange of the Z+ ion by an H+ ion to thereby form a product of the general formula $HV_3O_8$;

b) forming a second solution comprising the product of step (a), and a salt of a metal or semi-metal element (M), where such element differs from the element Z of step (a); and c) ion exchanging the H+ ion with such different metal or semi-metal element (M+) at a temperature and for a time sufficient to thereby form a compound of the general formula $M_xV_3O_8$.

16. The method according to claim 15, wherein step (a) is conducted at a temperature of about 10° C. to about 85° C.

17. The method according to claim 15, wherein step (c) is conducted at a temperature of about 10° C. to about 85° C.

18. The method according to claim 15, wherein step (c) is conducted for a time of about two to about ten hours.

19. The method according to claim 15, wherein Z is selected from the group consisting of Li, Na and K.

20. The method according to claim 15, wherein M is selected from the group consisting of metal and semi-metal elements other than group I alkali metals.

21. The method according to claim 15, wherein M is selected from the group consisting of transition metal elements.

22. The positive electrode according to claim 1 wherein the carbon-containing material consists essentially of particles of carbon.

23. The positive electrode according to claim 1 wherein the active material is in particle form and the active material particles are intermingled with the carbon particles.

24. The positive electrode according to claim 9 wherein the carbon-containing material consists essentially of particles of carbon.

25. The positive electrode according to claim 9 wherein the active material is in particle form and the active material particles are intermingled with the carbon particles.

* * * * *